Patented Dec. 18, 1951

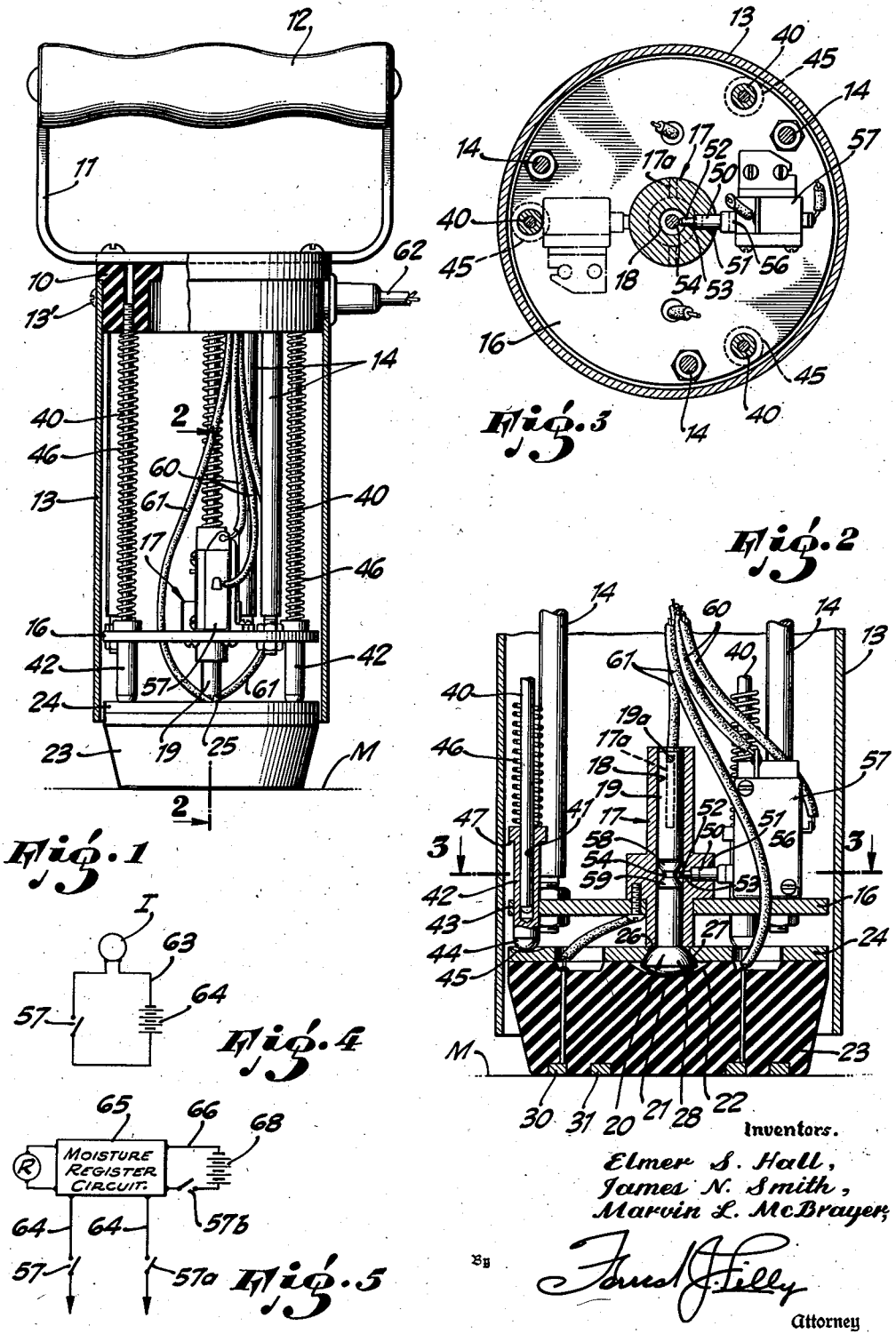

2,579,316

UNITED STATES PATENT OFFICE 2,579,316

PRESSURE SENSITIVE MOISTURE TEST INSTRUMENT

Elmer S. Hall, Riverdale, Md., and James N. Smith, Laguna Beach, and Marvin L. McBrayer, Alhambra, Calif., assignors to Moisture Register Company, Alhambra, Calif., a corporation of California Application August 18, 1947, Serial No. 769,156

1 Claim. (Cl. 175—183)

This invention relates generally to instruments for determining the moisture content of materials, and more particularly to electrical instruments for such purpose provided with an electric moisture register circuit including electrodes which are applicable to the material. This circuit may establish either a current flow, or an electric field, through the material on test, which current flow or field as the case may be is influenced by the moisture content present in the material, causing a corresponding change in current flow or voltage in the circuit, and a suitable meter connected in said circuit may be calibrated in terms of percentage of moisture present in the material.

There are several varieties of this general circuit, including the resistance type, dependent upon current flow through the material; the dielectric type, dependent upon change in dielectric constant with variations in moisture; and the power absorption type, dependent upon variations in power absorbed from a high frequency electric field by the moisture content present. The preferred circuit is of the latter class, and examples thereof are disclosed in prior Patent Number 2,231,035 to Stephens and Dallas. The present invention is applicable, however, to any of the types mentioned.

It is found in the case of instruments of the character referred to, particularly with materials of some degree of compressibility, that there may be some variability of reading with different degrees of contact pressure between the electrodes and the material on test. Thus, first of all, electrical contact resistance varies with contact pressure, giving some increase in reading with increasing contact pressure. Next, the density of the material on test is sometimes increased rather substantially with increasing contact pressure, giving a tendency to higher readings with increasing pressure. Finally, with some types of projecting electrodes, certain materials will be subject to distortion into spaces between the electrodes, giving increasing readings with increasing pressure. Any or all of such effects, or others, lead to unreliability of the readings taken. While these effects are quite negligible with some types of materials, particularly hard and unyielding materials, with others they are so substantial that the readings taken are entirely unreliable.

It is accordingly a primary object of the present invention to provide a moisture testing instrument of the general character referred to, in which the effects of varying contact pressures on the ultimate readings taken is entirely eliminated.

In accordance with the invention, speaking broadly, provisions are made whereby readings will be taken only at a predetermined degree of contact pressure between the electrodes and the material on test. The readings always being taken at this accurately predetermined contact pressure, they will be independent of conditions at other degrees of contact pressures. In accordance with one form of the invention, signal means including for instance an indicator light, are provided and are energized when the predetermined degree of contact pressure has been achieved, thus enabling moisture readings to be read when that precise pressure has been achieved. In accordance with other variations of the invention, circuit elements of the moisture test instrument are automatically closed to permit operation of the instrument only when the predetermined degree of contact pressure has been achieved. Thus, when this form of the invention is used, readings will be given, and can be taken, only when the predetermined contact pressure has been achieved.

The invention will be better understood by referring now to the following detailed description of an illustrative instrument embodying the invention, reference being had for this purpose to the accompanying drawings, in which:

Figure 1 is a side elevation of an instrument in accordance with the invention, a portion of the cap of the instrument being broken away;

Figure 2 is a section taken on line 2—2 of Figure 1;

Figure 3 is a transverse section taken on line 3—3 of Figure 2;

Figure 4 shows a signal circuit employed in the invention; and

Figure 5 shows a moisture register circuit in accordance with the invention.

In the drawings, numeral 10 designates generally an insulation cap, to the upper end of which is screwed a handle bracket 11 carrying a handle 12 by means of which the instrument may be manipulated. Fitting over and projecting downwardly from cap 10 is a cylindrical casing 13, here shown as secured at its upper end to the cap by means of screws 13', and having its lower end open.

Longitudinal mounting rods 14, in this instance three in number, are screwed at their upper ends into cap 10, and carry at their lower ends a circular mounting plate 16 whose diameter is such as to provide a small clearance between it and the casing 13. Centrally mounted in this plate 16 is a cam rod guide member 17 having a vertical bore 18 adapted to slidably receive a switch actuating cam rod 19. To prevent the latter from turning, it may be provided with a transverse pin 19a working in a vertical slot 17a in guide member 17.

Cam rod 19 has at its lower end an enlarged head 20 formed with an arcuate or rounded lower surface 21, which bears on a concave surface 22 of somewhat larger radius of curvature, formed in the center of the upper surface of circular nose block 23 formed of a suitable insulation material. A metal plate or disc 24, of the same diameter as nose block 23, is secured to the latter by suitable screws such as 25, and has a central aperture 26 defined in part by a concave bearing surface 27 adapted to coact with the complementary arcuate surface 28 defining the upper portion of cam rod head 20. The connection means thus described between cam rod head 20 and electrode nose block 23 permits the latter a certain limited degree of rocking action with respect to the cam rod, such as some times becomes desirable in effecting an accommodation of the forward plane of the electrode nose block to the material on test during an application of the instrument to the material in question. Nose block 23 is thus capable of a limited degree of universal rocking movement on the lower end portion of the cam rod 19.

The nose block 23 carries the electrodes which are applicable to the material to be tested, and while these electrodes may be of various geometrical configurations, they are here shown for illustrative purposes to comprise a pair of concentric rings 30 and 31 embedded in the plane lower end surface of the block, so as to be precisely flush therewith. The nose block 23, which normally projects almost wholly from casing 13, is shown in Figures 1 and 2 as having been applied to a surface of material M to be tested; in Figure 1, the instrument is in contact with the material M but no pressure has yet been applied, while in Figure 2 a substantial degree of pressure has been applied and the nose block is shown somewhat retracted inside the casing 13, by an action which will be described presently.

A plurality of longitudinal guide rods 40, here three in number, are screwed at their upper ends into the cap 10, their lower end portions being slidably received within central bores 41 extending downwardly into pressure plungers 42. The latter are slidably mounted in guide holes 43 formed in plate 16, and their rounded lower end portions 44 bear downwardly against the top plate 24 of nose block 23, the plate being preferably dimpled, as at 45, to afford a concave bearing surface for the plungers such as will oppose rotation of the nose block on the cam rod. A long compression spring 46 encircles each of rods 40, its upper end bearing against the under side of cap 10, and its lower end bearing downwardly against plunger 42. These springs maintain the nose block normally in the position of Figure 1, with the shoulders 47 formed near the upper ends of the plungers 42 in engagement with mounting plate 16. As the instrument is forced downwardly against the surface of a sample of material M to be tested, the springs 46 yield to permit downward movement of the movable portions of the instrument, including cap 10, casing 13 and mounting plate 16, with the cam rod guide sleeve 17 carried by the latter. This downward movement may extend to the position of Figure 2, or beyond. The long length of the springs is of importance, as it gives a substantial degee of such movement for a relatively small increase of downward pressure exerted on the handle 12. The importance of this feature will be more fully appreciated hereinafter.

The mounting structure as thus described permits a limited rocking action of the electrode nose block of the instrument relative to the longitudinal axis of the instrument. The rocking mounting of the nose block on the cam rod head has already been described. The nose block is also capable of rocking relatively to the pressure plungers 42, which are capable of retraction differentially against their respective springs as the nose block is rocked to one side or the other.

A switch actuating plunger 50 is slidably mounted in a horizontal bore 51 formed in guide member 17, and has a reduced cam follower pin 52 projecting through reduced bore 55 into engagement with the side of cam rod 19. As the instrument is pressed down against the surface M, the cam rod rides relatively up in the sleeve 17 to a predetermined position wherein a necked down cam groove 54 formed therearound becomes alined with plunger 50 and permits said plunger to move inwardly as from the dotted line to the full line position of Figure 2. The plunger 50, normally having its pin 52 in engagement with the full size cam rod, normally depresses the spring-actuated switch-opening button 56 of a conventional micro-switch 57 mounted on plate 16 opposite plunger 50. As the cam groove 54 alines with the plunger, the spring actuated switch button forces the plunger ahead, as to the position shown in Figure 2, and the micro-switch will be understood to close its contacts at such time.

Further depression of the instrument, or release thereof, causes the plunger pin 50 to ride out of the cam groove on one or the other of the steeply inclined cam shoulders 58 and 59, thereby depressing switch button 56 to open the micro-switch. The cam groove 54 and shoulders 58 and 59 are so formed that only a very slight vertical movement of the cam rod 19 relative to plunger 50, as the instrument casing is being pressed down or released, is sufficient to move the plunger 50 the necessary distance to close or open the micro-switch. And since, owing to use of the long springs 46, a relatively small pressure change requires a relatively long vertical travel of the instrument casing, the micro-switch is actuated between open and closed positions by a relatively slight pressure change, and the instrument is therefore highly pressure sensitive. In other words, the micro-switch will be closed only throughout a very slight, predetermined increment of pressure range. The micro-switch 57, pressure controlled as thus described, is utilized to determine the instant at which the moisture reading is taken, from the moisture register circuit, and its control over the time of reading can be effected in various ways in accordance with the invention, as presently to be edscribed.

A part of the moisture register circuit can be contained in the cavity of the instrument case, and can be suspended, if desired, from the insulation cap 10. It is generally desirable, however, to have at least the batteries and indicating meter in a separate case (not shown) with a connecting cable between. These arrangements are known and form no part of the present invention, and are therefore not detailed herein. In Figures 1 to 3, we show simply leads 60 from the micro-switch, and lead 61 from the electrode rings, which will be understood to be gathered properly into the electric circuiting provided; and we also show an exterior cable 62 leading from the cap 10, and which may be understood as typically connected to a power source and indicating meter.

According to the embodiment diagrammed in Figure 4, the micro-switch 57 is included in a signal circuit 63, including battery 64 and signal element I, for example, a signal light. The moisture register circuit in this instance may be of the type conventionally diagrammed in Figure 5, but with the micro-switches omitted. It will be evident that the micro-switch 57 in circuit 63 will be closed at a predetermined depression of the instrument casing, and will at such time effect an illumination of signal light I. Still greater depression will open the micro-switch, and therefore darken the signal lamp. Accordingly, illumination of the light I signals the predetermined pressure at which moisture register readings are to be taken, and as such readings are to be taken only when the signal light is illuminated, variability of readings from variable contact pressure conditions are eliminated.

Figures 5 shows an alternative embodiment of the invention in which the micro-switch is included in the moisture register circuit itself. The moisture register circuit is indicated generally by numeral 65, and is here shown as having output circuit 66 leading to electrode elements 30 and 31 adapted for contact with the surfaces of the material to be tested, as already explained. The moisture register circuit, also here shown as including power circuit 67, includes battery 68. This moisture register circuit may, as already stated, be of any suitable character, though it is preferably of the type disclosed in the aforementioned Patent Number 2,231,035. The circuit arrangements disclosed in said patent include power or anode circuits corresponding to circuit 67 of Figure 5, and also output or electrode circuits corresponding to the circuit 66 of Figure 5. The moisture register circuit includes also a meter R by which readings may be taken, and this meter might be in the output circuit, in the power circuit, or otherwise. According to one embodiment of the present invention, the previously described micro-switch 57 of Figures 1 to 3 is included in one side of output circuit 66, as indicated. Improvement is gained by including a second micro-switch 57a in the other side of circuit 66, and Figure 3 of the drawings suggests in dot-dash lines, how such an additional micro-switch may be included in the instrument, to be actuated simultaneously with micro-switch 57. For the present, the micro-switch indicated in Figure 5 at 57b may be disregarded, or may be considered to remain closed. It will be evident that, as the instrument of Figures 1 to 3 equipped with the circuit arrangement of Figure 5 is depressed against the material to be tested, micro-switches 57 and 57a will be closed at a predetermined electrode contact pressure, and will at such time connect the moisture register circuit to the output electrode elements 30 and 31. The moisture register instrument will give no reading until this predetermined contact pressure is established; but at such time, the output circuit is closed, power is absorbed by the material on test, and a reading is given by the moisture register indicator instrument R. This reading, of course, corresponds to the predetermined pressure applied to the instrument at the time the micro-switch and its output circuit are closed, and may be calibrated in terms of moisture content for that degree of contact pressure. The reading so obtained will evidently be independent of the variability factors otherwise introduced by varying contact pressure.

Micro-switches currently available some times behave erratically when the current flow to be switched is of an exceedingly low order of magnitude, such as may be the case in the output circuit 66 of the moisture register instrument. Accordingly, Figure 5 shows an alternative arrangement in which the micro-switch, this time indicated at 57b, is placed in the power circuit 67 rather than in the output circuit 66. In this instance, it is to be understood that the micro-switches 57 and 57a may be either omitted, held closed, or may be closed prior to switch 57b; and it will also be understood that the micro-switch 57b in power circuit 67 corresponds with the micro-switch 57 of Figures 1 to 3. In this instance, also, moisture register readings are unobtainable until such time as the predetermined electrode contact pressure is established, at which instant the micro-switch in the power circuit energizes the moisture register circuit and permits a reading. This reading is of course related, as before, to electrode contact pressure, but since the contact pressure will adways be the same, the moisture register readings at R may be interpreted or calibrated in terms of moisture content.

In the present illustrations, the micro-switches control or operate the circuits by a closing operation, though it will be evident to those skilled in the art that, as is usual in such circuits, rearrangement permitting control by a switch-opening arrangement is possible, and is within the scope of the invention.

Various alternative structural and circuit arrangements are of course possible, the present disclosure being simply illustrative of certain present embodiments of the invention. No limitation is therefore to be implied beyond what is fairly expressed in the appended claim.

We claim:

In an electric moisture register instrument: an electrode support block, electrode means carried by said support block, a mounting block spaced from said electrode support block, means connecting said mounting block and said electrode support block comprising a plurality of mounting rods tightly connected at one end to said mounting block, plungers slidably mounted on the other ends of said rods and having supporting bearing against said electrode support block, coil compression springs on said rods acting between said mounting block and said plungers, a guide plate between said electrode support and said mounting block having apertures passing and slidably supporting said plungers, means supporting said guide plate from said mounting block, a cam rod having a swivelled connection with said electrode support block, a guide sleeve on said guide plate slidably receiving said cam rod, a micro-switch on said guide plate, said cam rod having a cam formation thereon, and a cam follower element engaged by said cam and operatively engaging said micro-switch.

ELMER S. HALL.
JAMES N. SMITH.
MARVIN L. McBRAYER.

REFERENCES CITED

The following references are of record in the file of this patent:

UNITED STATES PATENTS

| Number | Name | Date |
|---|---|---|
| 1,610,563 | McIlvaine | Dec. 14, 1926 |
| 2,003,910 | Stephenson | June 4, 1935 |
| 2,063,840 | Fairchild et al. | Dec. 8, 1936 |
| 2,082,364 | Store | June 1, 1937 |
| 2,170,197 | Gumprich | Aug. 22, 1939 |